United States Patent
Steiner et al.

(10) Patent No.: US 9,325,848 B2
(45) Date of Patent: Apr. 26, 2016

(54) METHOD, APPARATUS, AND SYSTEM FOR PROVIDING RIPPLE REDUCTION USING NEAR TERM SIMULATION FOR OPTIONAL SEQUENCING

(71) Applicant: Avaya Inc., Basking Ridge, NJ (US)

(72) Inventors: Robert C. Steiner, Broomfield, CO (US); Katherine Anthony Sobus, Wilmington, DE (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 14/041,834

(22) Filed: Sep. 30, 2013

(65) Prior Publication Data

US 2015/0092938 A1    Apr. 2, 2015

(51) Int. Cl.
*H04M 3/523* (2006.01)

(52) U.S. Cl.
CPC ...... *H04M 3/5233* (2013.01); *H04M 2203/402* (2013.01)

(58) Field of Classification Search
CPC .............. H04M 3/523; H04M 3/5233; H04M 2203/402
USPC .............. 379/265.03, 265.05, 265.11–265.14
See application file for complete search history.

(56) References Cited

U.S. PATENT DOCUMENTS

| | | | |
|---|---|---|---|
| 6,535,600 B1 | 3/2003 | Fisher et al. | |
| 2003/0099343 A1* | 5/2003 | Dezonno | 379/265.11 |
| 2010/0235218 A1 | 9/2010 | Erhart et al. | |
| 2010/0296417 A1 | 11/2010 | Steiner | |
| 2011/0125793 A1 | 5/2011 | Erhart et al. | |
| 2011/0125826 A1 | 5/2011 | Erhart et al. | |
| 2011/0255683 A1 | 10/2011 | Flockhart et al. | |
| 2013/0287202 A1* | 10/2013 | Flockhart et al. | 379/265.12 |
| 2014/0079210 A1* | 3/2014 | Kohler et al. | 379/265.12 |
| 2014/0334619 A1* | 11/2014 | Placiakis | H04M 3/5233 379/265.12 |

* cited by examiner

*Primary Examiner* — Harry S Hong
(74) *Attorney, Agent, or Firm* — Sheridan Ross P.C.

(57) ABSTRACT

A contact center is described along with various methods and mechanisms for administering the same. A ripple reduction mechanism is disclosed that provides an interval and evaluates and matches work items that come in until the interval expires. Once the interval expires, the ripple reduction mechanism in concert with a work assignment engine may finalize matches and optimally assign work items to minimize or eliminate a ripple effect.

20 Claims, 5 Drawing Sheets

METHOD, APPARATUS, AND SYSTEM FOR PROVIDING RIPPLE REDUCTION USING NEAR TERM SIMULATION FOR OPTIONAL SEQUENCING

FIELD OF THE DISCLOSURE

The present disclosure is generally directed toward communications and more specifically toward contact centers.

BACKGROUND

Contact centers run highly sophisticated algorithms to match appropriately-skilled agents to difficult work items. The difficult work items are typically routed and assigned to available agents with appropriate skills as they arrive at the contact center. Contact center systems have ways of determining which highly skilled agents are or are not available. Unfortunately, contact center systems are not configured to become aware of when skilled agents might be freeing up in the near future. Furthermore, existing contact center systems to do not have the ability to see if there are difficult work items for which an agent may be better suited that are coming up within a very short timeframe. Generally, currently available contact center systems are only configured to see one match ahead or one deep. Difficult work items may not go to the best agent if he or she is not immediately available.

SUMMARY

It is with respect to the above issues and other problems that the embodiments presented herein were contemplated. In particular, embodiments of the present disclosure describe a ripple reduction mechanism operable to evaluate a temporally bounded set of work items that are run through a simulation, subject to complex matching in near-real time for optimal agent assignment.

A ripple effect is a chain reaction where one highly skilled agent assignment decision and difficult work item match impacts sequential behavior, impacting the next decision and match, and these in turn impact the next decision and match, and so on. The first decision and match may or may not be significant, depending on how many resources are available. The next decision might be a little more serious, as it has the impact of the first decision and match and the number of highly skilled agents has diminished. The next decision and match is even more serious as it is impacted by the first two decisions and the number of highly skilled agents available declines again. At some point, the impact of the prior decisions may leave one or more difficult work items stranded, meaning that no highly skilled agent is available because each highly skilled agent is busy with one or more work items which may not be as difficult as the stranded work item. Lesser skilled agents may not get the difficult work item if they aren't qualified. Every decision affects the next decision, and the consequences are additive in one direction (e.g., in this case, negatively impacting). A customer might end up in a ten-second or three-minute wait because of the impact of the decisions made just before his difficult work item was received or arrived at the top of a work item queue.

If highly skilled agents take work items that could be managed by medium skilled agents, the highly skilled agents are not utilized efficiently. The ripple effect occurs where the highly skilled agents are unavailable for the most difficult work items. The overall impact of the situation can escalate quickly. The lack of availability of the highly skilled agents for difficult work items may be very costly to the contact center through loss of revenue and customer dissatisfaction.

In some embodiments, the ripple reduction mechanism proposed herein creates and executes a matching interval that spans a predetermined interval of time (e.g., 1-5 seconds). The matching interval can be fixed, windowed, or continuous. A fixed matching interval is an interval that may run for a predetermined time (i.e., every 5 seconds). A windowed matching interval is an interval that may complete over a last-N work item in time (i.e., sliding window). A continuous matching interval is an interval that when a new work item is added to a work sub-group, the oldest work item may be required to be assigned to the most recently matched available highly skilled agent (i.e., one work item in, one work item out).

The matching interval looks at all of the current algorithmic matching decisions within the predetermined interval of time, then evaluates and matches work items until the interval expires. A near-term simulator is also disclosed with the ability to look at pending work items and run matching algorithms during the interval. Once the interval expires, the ripple reduction mechanism may finalize matches and assign work items to agents.

In accordance with embodiments of the present disclosure, the ripple reduction algorithm, which is a form of alternate execution of sequence matches, can provide ripple reduction in two ways. A first ripple reduction may be provided when a work item could have a better match in queue, determined by taking into account weighted historical data. The second ripple reduction may be provided when contextual clues about the contact, agent, and/or the work item are considered, adding a small amount of processing time to a work assignment assessment.

In a non-limiting example, a busy contact center may receive as many as 100-200 calls per second. One goal is to send a difficult work item to Max, a highly proficient, high-performing agent who is available and able to receive work. Max is assigned work item #5 which is of medium difficulty because he is the best match at that time. After work item #5 has been assigned and accepted by Max, work item #8 comes into the contact center. High difficulty work item #8 is a better match for Max as it requires an expert, but the opportunity to route work item #8 to Max in current systems is lost since work assignments are temporally and sequentially matched. Even though a medium skilled agent named Ivy was available and capable of working on work item #5, she was not the best match for #5. Ivy is not enough of an expert to work on work item #8, so work item #8 sits in queue. Work item #8 may eventually be matched to Ivy if Max is unavailable too long, even though she is not the best agent on shift to take work item #8.

Approximately 200 pieces of work may be under consideration for Max in any given second. Using the ripple reduction algorithm as disclosed herein, with a 2-second simulation interval, work item #8 is held for a two seconds until work item #5 comes in. Work item #8 can then be matched to Max while Ivy is assigned work item #5. There is a moment where the small cost of not immediately matching Max to work item #5 is outweighed by his availability to take work item #8 and Ivy's ability to take work item #5. Max successfully completes work item #8, bringing a critical customer back into service. Ivy successfully completes work item #5 after dialing into the customer's system and providing some routing corrections. Both customers benefit from the optimized work assignment as the agents are deployed using a simulation that gives a quick look ahead. Both agents and the contact center as a whole benefit from the optimized work assignment as each agent is enabled to work within their respective skill level. Work item #12, which comes in after work item #8, and work item #5 may be slightly impacted by the assignments to Ivy and Max, but much less so than if the work items were assigned using a traditional contact center temporal work assignment system.

In some embodiments, variations of simulations may be run, where the length determiner can be specifically attribute-based, including but not limited to goals-based, fairness-based, customer-experience-based, or any combination of attributes.

In some embodiments, the ripple reduction mechanism can include running a specialized embodiment where the system evaluates work items for a period of time with continuous matching against available resources until a time window closes, as determined by goals of an organization, customer experience, and/or agent situations, considering several different types of calls and resources. The embodiment would be optimized especially for dynamic and complex contact centers.

An additional embodiment can allow a supervisor to run various algorithms for short-term circumstances to determine staffing and efficient assignments by agent, resource, location, and/or group. Different models could be used to predict outcomes, including but not limited to highest revenue, best service quality, etc. Additionally, measurements might be taken on the predictions and simulations compared to outcomes. Future strategies would be adjustable, like Estimated Wait Time (EWT).

The use of a ripple reduction mechanism to evaluate and match difficult contact center work items for a specified interval reduces and/or eliminates the accumulated ripple effect. The optimization of difficult work item assignment saves a contact center time and money and provides increased satisfaction for agents and customers.

These and other advantages will be apparent from the disclosure.

In some embodiments, a method is provided that generally comprises:

collecting a plurality of work items in a contact center, a first work item in the plurality of work items being received at a first time, a second work item in the plurality of work items being received at a second time, wherein the second time is later than the first time but both the first and second time are within a predetermined interval of time;

analyzing each of the plurality of work items received during the predetermined interval of time against a plurality of agents in a contact center to determine an agent to assign to each of the plurality of work items, wherein a first of the plurality of agents is not available at the first time but is available within the predetermined interval of time, and wherein a second of the plurality of agents is available at the first time but is less-qualified to handle the first work item as compared to the first agent;

wherein a result of the analysis causes the first work item in the plurality of work items to be assigned to the first of the plurality of agents within the predetermined interval of time; and wherein the assignment of the first work item in the plurality of work items received at the first time and assigned to the first of the plurality of agents requires a more-qualified agent as compared to the second agent.

The phrases "at least one," "one or more," and "and/or" are open-ended expressions that are both conjunctive and disjunctive in operation. For example, each of the expressions "at least one of A, B and C," "at least one of A, B, or C," "one or more of A, B, and C," "one or more of A, B, or C" and "A, B, and/or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process, method, or operation done without material human input when the process, method, or operation is performed. However, a process, method, or operation can be automatic, even though performance of the process, method, or operation uses material or immaterial human input, if the input is received before performance of the process, method, or operation. Human input is deemed to be material if such input influences how the process, method, or operation will be performed. Human input that consents to the performance of the process, method, or operation is not deemed to be "material."

The term "computer-readable medium" as used herein refers to any tangible storage that participates in providing instructions to a processor for execution. Such a medium may take many forms, including but not limited to, non-volatile media, volatile media, and transmission media. Non-volatile media includes, for example, NVRAM, or magnetic or optical disks. Volatile media includes dynamic memory, such as main memory. Common forms of computer-readable media include, for example, a floppy disk, a flexible disk, hard disk, magnetic tape, or any other magnetic medium, magneto-optical medium, a CD-ROM, any other optical medium, punch cards, paper tape, any other physical medium with patterns of holes, a RAM, a PROM, and EPROM, a FLASH-EPROM, a solid state medium like a memory card, any other memory chip or cartridge, or any other medium from which a computer can read. When the computer-readable media is configured as a database, it is to be understood that the database may be any type of database, such as relational, hierarchical, object-oriented, and/or the like. Accordingly, the disclosure is considered to include a tangible storage medium and prior art-recognized equivalents and successor media, in which the software implementations of the present disclosure are stored. When the computer-readable media is configured as a database, it is to be understood that the database may be any type of database, such as relational, hierarchical, object-oriented, and/or the like.

The terms "determine", "calculate", and "compute," and variations thereof, as used herein, are used interchangeably and include any type of methodology, process, mathematical operation or technique.

The term "module" as used herein refers to any known or later developed hardware, software, firmware, artificial intelligence, fuzzy logic, or combination of hardware and software that is capable of performing the functionality associated with that element. Also, while the disclosure is described in terms of illustrative embodiments, it should be appreciated that individual aspects of the disclosure can be separately claimed.

BRIEF DESCRIPTION OF THE DRAWINGS

The present disclosure is described in conjunction with the appended figures.

DETAILED DESCRIPTION

The ensuing description provides embodiments only, and is not intended to limit the scope, applicability, or configuration of the claims. Rather, the ensuing description will provide those skilled in the art with an enabling description for implementing the embodiments. It being understood that various changes may be made in the function and arrangement of elements without departing from the spirit and scope of the appended claims.

Figure 1:
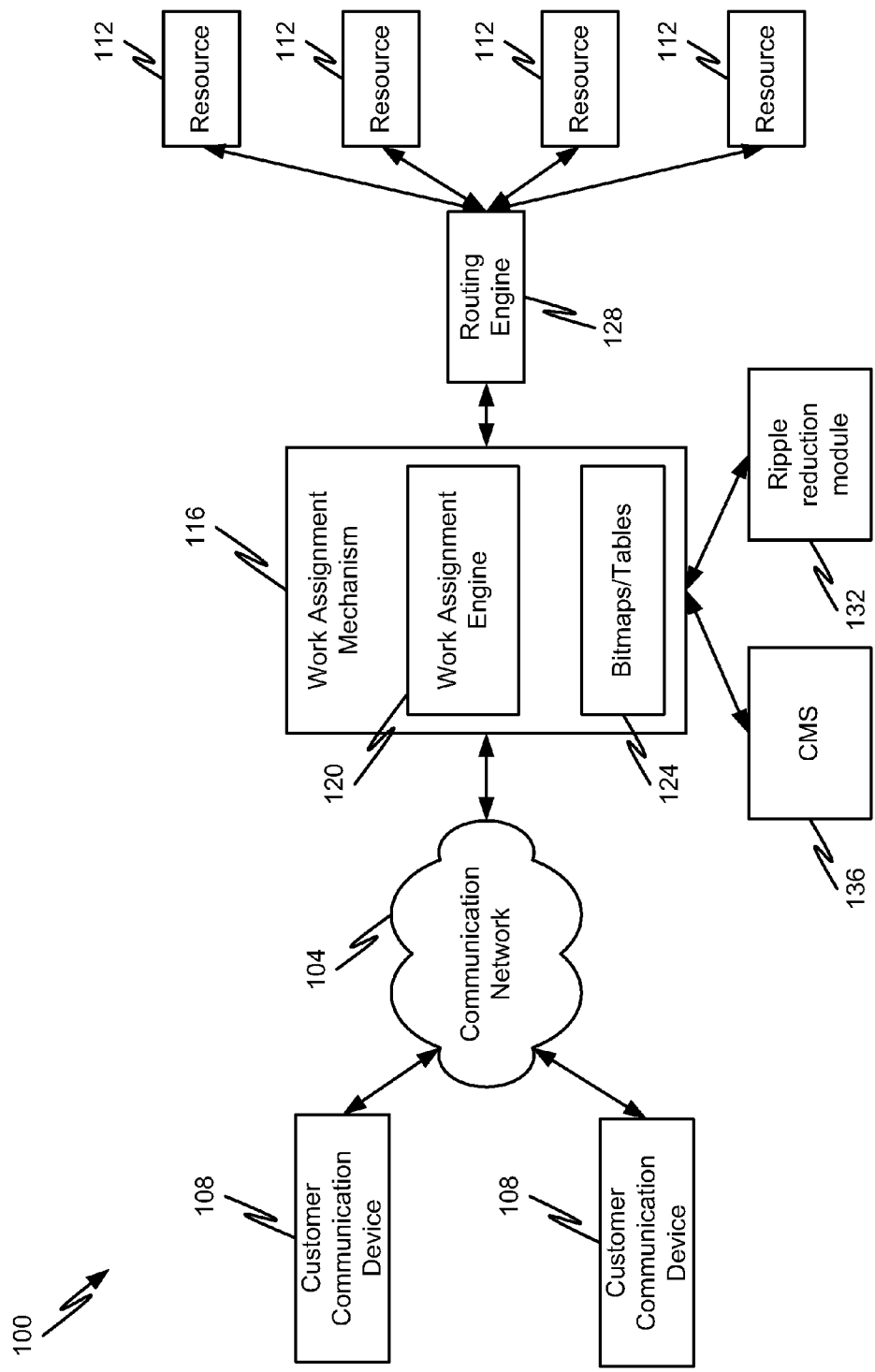
FIG. 1 is a block diagram of a communication system in accordance with embodiments of the present disclosure.

FIG. 1 depicts a communication system 100 in accordance with at least some embodiments of the present disclosure. The communication system 100 may be a distributed system and, in some embodiments, comprises a communication network 104 connecting one or more communication devices 108 to a work assignment mechanism 116, which may be owned and operated by an enterprise administering a contact center in which a plurality of resources 112 are distributed to handle incoming work items (in the form of contacts) from the customer communication devices 108.

In accordance with at least some embodiments of the present disclosure, the communication network 104 may comprise any type of known communication medium or collection of communication media and may use any type of protocols to transport messages between endpoints. The communication network 104 may include wired and/or wireless communication technologies. The Internet is an example of the communication network 104 that constitutes an Internet Protocol (IP) network consisting of many computers, computing networks, and other communication devices located all over the world, which are connected through many telephone systems and other means. Other examples of the communication network 104 include, without limitation, a standard Plain Old Telephone System (POTS), an Integrated Services Digital Network (ISDN), the Public Switched Telephone Network (PSTN), a Local Area Network (LAN), a Wide Area Network (WAN), a Session Initiation Protocol (SIP) network, a Voice over IP (VoIP) network, a cellular network, and any other type of packet-switched or circuit-switched network known in the art. In addition, it can be appreciated that the communication network 104 need not be limited to any one network type, and instead may be comprised of a number of different networks and/or network types. As one example, embodiments of the present disclosure may be utilized to increase the efficiency of a grid-based contact center. Examples of a grid-based contact center are more fully described in U.S. Patent Publication No. 2010/0296417, the entire contents of which are hereby incorporated herein by reference. Moreover, the communication network 104 may comprise a number of different communication media such as coaxial cable, copper cable/wire, fiber-optic cable, antennas for transmitting/receiving wireless messages, and combinations thereof.

The communication devices 108 may correspond to customer communication devices. In accordance with at least some embodiments of the present disclosure, a customer may utilize their communication device 108 to initiate a work item, which is generally a request for a processing resource 112. Illustrative work items include, but are not limited to, a contact directed toward and received at a contact center, a web page request directed toward and received at a server farm (e.g., collection of servers), a media request, an application request (e.g., a request for application resources location on a remote application server, such as a SIP application server), and the like. The work item may be in the form of a message or collection of messages transmitted over the communication network 104. For example, the work item may be transmitted as a telephone call, a packet or collection of packets (e.g., IP packets transmitted over an IP network), an email message, an Instant Message, an SMS message, a fax, and combinations thereof.

In some embodiments, the communication may not necessarily be directed at the work assignment mechanism 116, but rather may be on some other server in the communication network 104 where it is harvested by the work assignment mechanism 116, which generates a work item for the harvested communication. An example of such a harvested communication includes a social media communication that is harvested by the work assignment mechanism 116 from a social media network or server. Illustrative architectures for harvesting social media communications and generating tasks based thereon are described in U.S. Patent Publication Nos. 2010/0235218, 2011/0125826, and 2011/0125793, the entire contents of each are hereby incorporated herein by reference in their entirety.

The format of the work item may depend upon the capabilities of the communication device 108 and the format of the communication.

In some embodiments, work items and tasks are logical representations within a contact center of work to be performed in connection with servicing a communication received at the contact center (and more specifically the work assignment mechanism 116). With respect to the traditional type of work item, the communication associated with a work item may be received and maintained at the work assignment mechanism 116, a switch or server connected to the work assignment mechanism 116, or the like until a resource 112 is assigned to the work item representing that communication at which point the work assignment mechanism 116 passes the work item to a routing engine 128 to connect the communication device 108 which initiated the communication with the assigned resource 112.

Although the routing engine 128 is depicted as separate from the work assignment mechanism 116, the routing engine 128 may be incorporated into the work assignment mechanism 116 or its functionality may be executed by the work assignment engine 120.

In accordance with at least some embodiments of the present disclosure, the communication devices 108 may comprise any type of known communication equipment or collection of communication equipment. Examples of a suitable communication device 108 include, but are not limited to, a personal computer, laptop, Personal Digital Assistant (PDA), cellular phone, smart phone, telephone, or combinations thereof. In general each communication device 108 may be adapted to support video, audio, text, and/or data communications with other communication devices 108 as well as the processing resources 112. The type of medium used by the communication device 108 to communicate with other communication devices 108 or processing resources 112 may depend upon the communication applications available on the communication device 108.

In accordance with at least some embodiments of the present disclosure, the work item is sent toward a collection of processing resources 112 via the combined efforts of the work assignment mechanism 116 and routing engine 128. The resources 112 can either be completely automated resources (e.g., Interactive Voice Response (IVR) units, processors, servers, or the like), human resources utilizing communication devices (e.g., human agents utilizing a computer, telephone, laptop, etc.), or any other resource known to be used in contact centers.

As discussed above, the work assignment mechanism 116 and resources 112 may be owned and operated by a common entity in a contact center format. In some embodiments, the work assignment mechanism 116 may be administered by multiple enterprises, each of which has their own dedicated resources 112 connected to the work assignment mechanism 116.

In some embodiments, the work assignment mechanism 116 comprises a work assignment engine 120 which enables the work assignment mechanism 116 to make intelligent routing decisions for work items. In some embodiments, the work assignment engine 120 is configured to administer and make work assignment decisions in a queueless contact center, as is described in U.S. Patent Application Serial No. 2011/0255683, the entire contents of which are hereby incorporated herein by reference.

More specifically, the work assignment engine 120 can generate bitmaps/tables 124 and determine, based on an analysis of the bitmaps/tables 124, which of the plurality of processing resources 112 is eligible and/or qualified to receive a work item and further determine which of the plurality of processing resources 112 is best suited to handle the processing needs of the work item. In situations of work item surplus, the work assignment engine 120 can also make the opposite determination (i.e., determine optimal assignment of a work item to a resource). In some embodiments, the work assignment engine 120 is configured to achieve true one-to-one matching by utilizing the bitmaps/tables 124 and any other similar type of data structure.

The work assignment engine 120 may reside in the work assignment mechanism 116 or in a number of different servers or processing devices. In some embodiments, cloud-based computing architectures can be employed whereby one or more components of the work assignment mechanism 116 are made available in a cloud or network such that they can be shared resources among a plurality of different users.

In accordance with at least some embodiments of the present disclosure, a ripple reduction module 132 comprises algorithms that may execute a simulation interval for optimized work item matching as work items are received by the contact center. More specifically, the ripple reduction module 132 can temporally bound one or more work items received from customer communication devices 208 in an interval as administered by a contact center manager and based on information and parameters from a CMS system 136. Matching and assignment recommendations provided by the ripple reduction module 132 interval can be used by the work assignment mechanism 116, work assignment engine 220, and the routing engine 128 to assign resources 112 once the simulation interval has expired, optimizing assignments and reducing the ripple effect.

Figure 2:
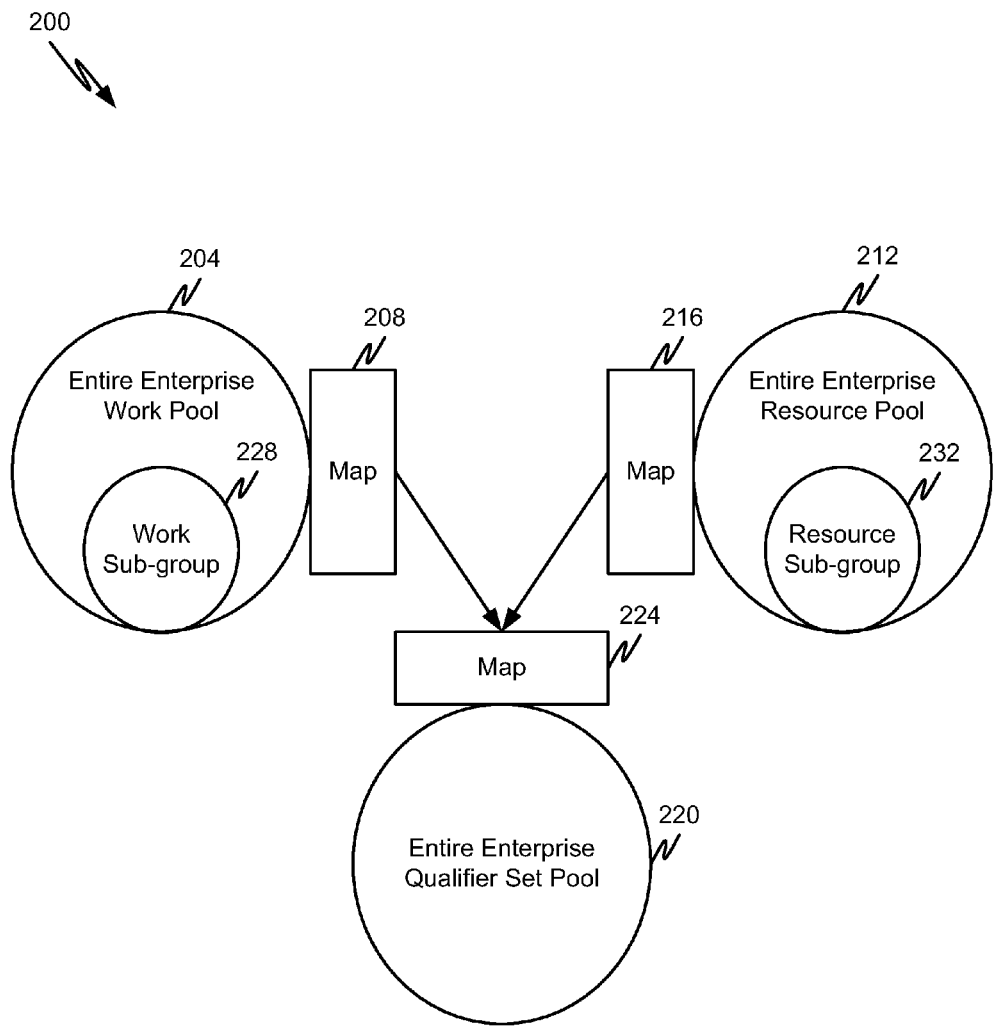
FIG. 2 is a block diagram depicting illustrative pools and bitmaps that are utilized in accordance with embodiments of the present disclosure.

FIG. 2 depicts illustrative data structures 200 which may be incorporated in or used to generate the bitmaps/tables 124 used by the work assignment engine 120. The illustrative data structures 200 include one or more pools of related items. In some embodiments, three pools of items are provided, including an enterprise work pool 204, an enterprise resource pool 212, and an enterprise qualifier set pool 220. The pools are generally an unordered collection of like items existing within the contact center. Thus, the enterprise work pool 204 comprises a data entry or data instance for each work item within the contact center at any given time.

In some embodiments, the population of the work pool 204 may be limited to work items waiting for service by or assignment to a resource 112, but such a limitation does not necessarily need to be imposed. Rather, the work pool 204 may contain data instances for all work items in the contact center regardless of whether such work items are currently assigned and being serviced by a resource 112 or not. The differentiation between whether a work item is being serviced (i.e., is assigned to a resource 112) may simply be accounted for by altering a bit value in that work item's data instance. Alteration of such a bit value may result in the work item being disqualified for further assignment to another resource 112 unless and until that particular bit value is changed back to a value representing that the work item is not assigned to a resource 112, thereby making the resource 112 eligible to receive another work item.

Similar to the work pool 204, the resource pool 212 comprises a data entry or data instance for each resource 112 within the contact center. Thus, resources 112 may be accounted for in the resource pool 212 even if the resource 112 is ineligible due to its unavailability because it is assigned to a work item or because a human agent is not logged-in. The ineligibility of a resource 112 may be reflected in one or more bit values.

The qualifier set pool 220 comprises a data entry or data instance for each qualifier set within the contact center. In some embodiments, the qualifier sets within the contact center are determined based upon the attributes or attribute combinations of the work items in the work pool 204. Qualifier sets generally represent a specific combination of attributes for a work item. In particular, qualifier sets can represent the processing criteria for a work item and the specific combination of those criteria. Each qualifier set may have a corresponding qualifier set identified "qualifier set ID" which is used for mapping purposes. As an example, one work item may have attributes of language=French and intent=Service and this combination of attributes may be assigned a qualifier set ID of "12" whereas an attribute combination of language=English and intent=Sales has a qualifier set ID of "13." The qualifier set IDs and the corresponding attribute combinations for all qualifier sets in the contact center may be stored as data structures or data instances in the qualifier set pool 220.

In some embodiments, one, some, or all of the pools may have a corresponding bitmap. Thus, a contact center may have at any instance of time a work bitmap 208, a resource bitmap 216, and a qualifier set bitmap 224. In particular, these bitmaps may correspond to qualification bitmaps which have one bit for each entry. Thus, each work item 228, 232 in the work pool 204 would have a corresponding bit in the work bitmap 208, each resource 112 in the resource pool 212 would have a corresponding bit in the resource bitmap 216, and each qualifier set in the qualifier set pool 220 may have a corresponding bit in the qualifier set bitmap 224.

In some embodiments, the bitmaps are utilized to speed up complex scans of the pools and help the work assignment engine 120 make an optimal work item/resource assignment decision based on the current state of each pool. Accordingly, the values in the bitmaps 208, 216, 224 may be recalculated each time the state of a pool changes (e.g., when a work item surplus is detected, when a resource surplus is detected, when a ripple effect is detected, etc.).

Within the population of the work pool 204, there may be a sub-group of work items 228 waiting for service by or assignment to a resource 112. The work sub-group 228 may contain work items tagged for, marked, or weighted based on content and/or difficulty for consideration by the ripple reduction module 132. The ripple reduction module 132 may bundle and match the work sub-group 228 for an administered interval for optional sequence matching.

Within the population of the resource pool 212, there may be a sub-group of resources 232 eligible and/or available to work medium to high difficulty work items. The resource sub-group 232 may contain resources 112 that have attributes and qualifications appropriate for consideration by the ripple reduction module 132 to reduce or eliminate the ripple effect. The ripple reduction module 132 may use the resource sub-group 232 for matching work items for an administered interval for optional sequence matching where the resource sub-group 232 may contain available qualified resources 112 and/or qualified resources 112 that are unavailable but could be considered for matching once the qualified resources 112 become available.

Figure 3:
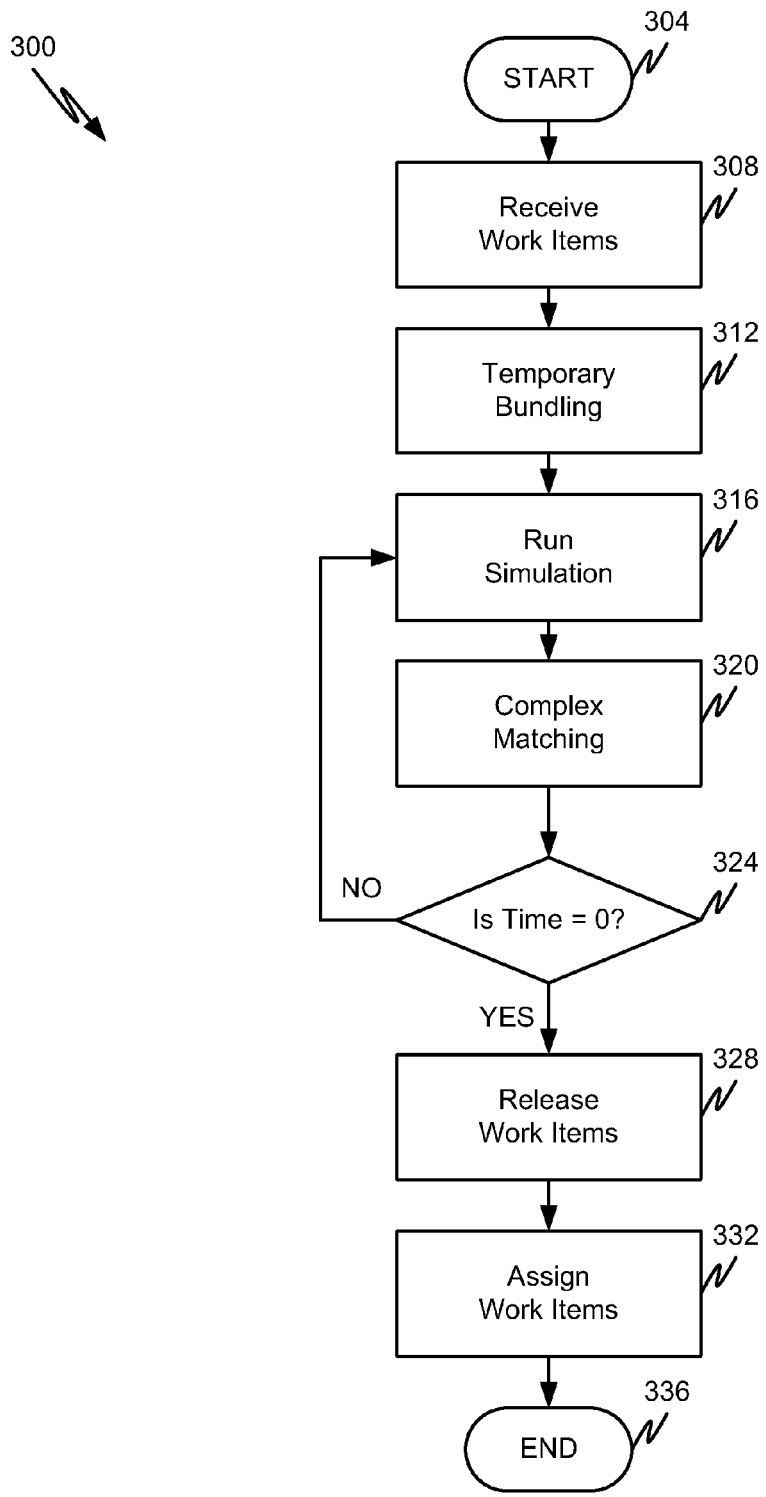
FIG. 3 is a flow diagram depicting a ripple reduction mechanism in accordance with embodiments of the present disclosure.

FIG. 3 is a flow diagram depicting a ripple reduction and optional sequencing method in accordance with an embodiment of the present disclosure. Generally, the method 300 begins with a start operation 304 and terminates with an end operation 336. While a general order for the steps of the method 300 are shown in FIG. 3, the method 300 can include more or fewer steps or the order of the steps can be arranged differently than those shown in FIG. 3. The method 300 can be executed as a set of computer-executable instructions executed by a computer system and encoded or stored on a non-transitory computer readable medium.

Typically, the method idles at step 304 until work items are received at a contact center, in step 308. A busy contact center may receive one hundred to two hundred work items per second. The communication system 100 may activate a ripple reduction module 132 to bundle a work sub-group 228 for an administratively determined interval of time, in step 312. In a non-limiting example, a contact center manager may set a simulation interval of three seconds, thereby enabling the ripple reduction module 132 to bundle as many as six hundred or more work items. The ripple reduction module 132 may run a simulation for all of the bundled work items, in step 316. At initiation of the simulation, the ripple reduction module 132 may start a clock for a pre-determined number of seconds. During the simulation, the ripple reduction module 132 is operable to run one or more matching algorithms on every single work item that has been included in the work sub-group 228. The algorithms run by the ripple reduction module 132 can be set up to match work items to a resource sub-group 232 in alignment with goals and statistics for the contact center, in step 320. Specifically, the ripple reduction module 132 may match work items in an effort to minimize agent idle time, minimize customer or work item wait time, maximize profit, minimize costs, and reduce or eliminate the ripple effect. Complex matching may include but is not limited to consideration of customer needs, agent skills, customer attributes, agent attributes, demographic and psychographic considerations, contextual analysis, agent performance, business priorities, and agent rankings In accordance with at least some embodiments of the present disclosure, the interval established by the ripple reduction module 132 can be temporally bounded. In step 324, the question may be asked whether or not the clock, set to the predetermined interval, has decremented until the time is equal to zero. If the answer is no, the time is not yet equal to zero, the method may return to step 316 and continue the simulation and complex matching. If the answer to the query of step 324 is yes and the time is equal to zero, then the method may move on to step 328. Work items may be released by the ripple reduction module 132 for assignment (step 328). In step 332, the unbundled work items may be assigned to an agent by the work assignment mechanism 116, the work assignment engine 120, the routing engine 128, or any combination of the three. Once the work items have been assigned, the method ends (step 336).

Figure 4:
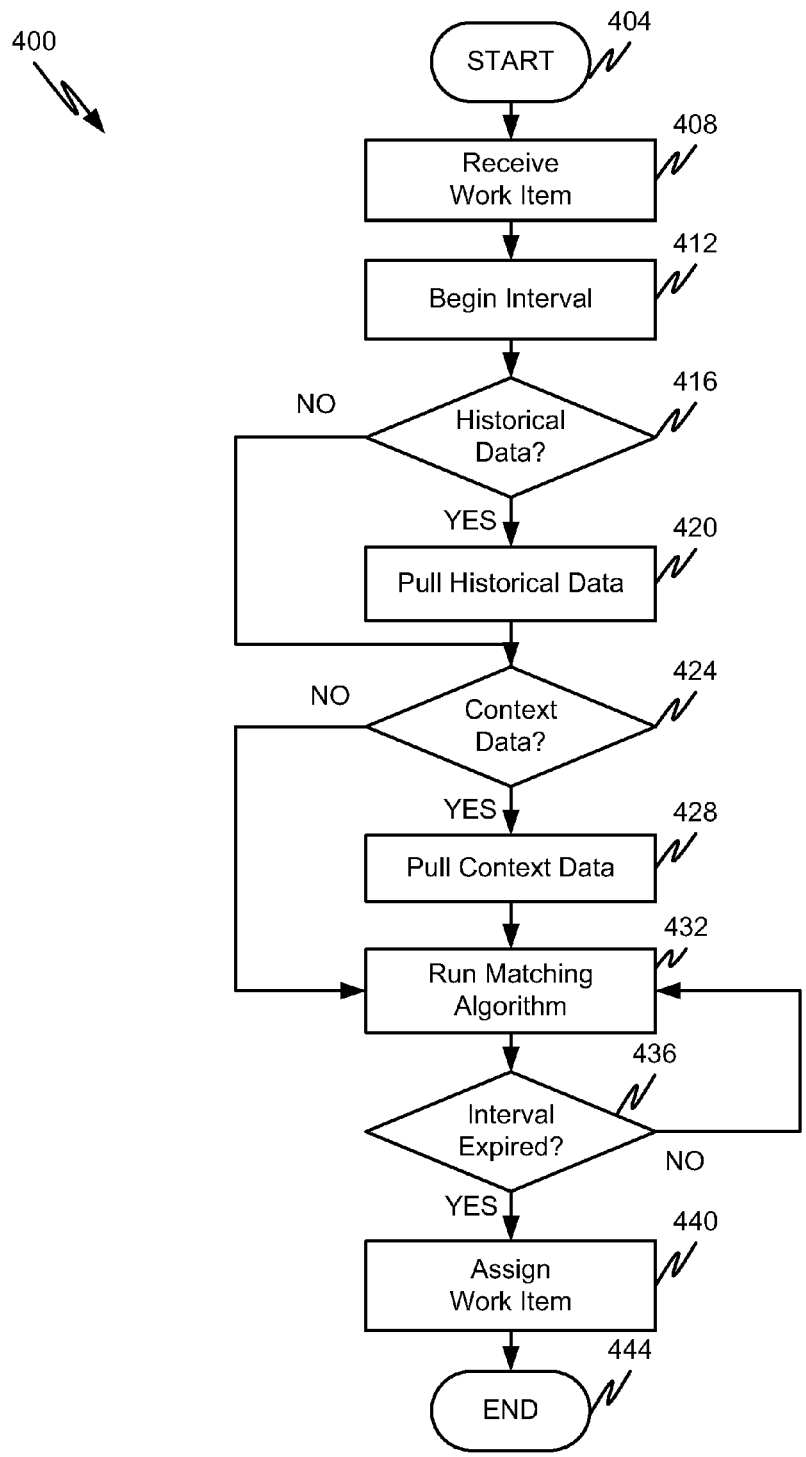
FIG. 4 is a flow diagram depicting the ripple reduction algorithm method in accordance with embodiments of the present disclosure.

FIG. 4 is a flow diagram depicting the ripple reduction algorithm method in accordance with an embodiment of the present disclosure. Generally, the method 400 begins with a start operation 404 and terminates with an end operation 444. While a general order for the steps of the method 400 are shown in FIG. 4, the method 400 can include more or fewer steps or the order of the steps can be arranged differently than those shown in FIG. 4. The method 400 can be executed as a set of computer-executable instructions executed by a computer system and encoded or stored on a non-transitory computer readable medium.

Typically, the method idles at step 404 until a work item is received at a contact center, in step 408. The predetermined interval described in FIG. 3 may begin, in step 412. During the interval, the ripple reduction module 132 may execute the ripple reduction algorithm. The ripple reduction algorithm is operable to check the work item for historical data, in step 416. Historical data might include, for example, customer interactions that include sales activities such as orders and purchases, usage, work orders, billing including balance and/or credit details, equipment, quotes, marketing, shipping information, and discount level. If the ripple reduction module 132 detects historical data in step 416, the historical data may be extracted (step 420) and used during the interval as a component of complex matching. If the ripple reduction module does not detect historical data in step 416, the method may move to step 424 to check the work item for context data. Context data might include, for example, a user's profile, browsing activity, situational and/or demographic information like geographic location and environmental conditions, age, education level, and gender; preferences including decisions the user has made and what the user has expressed to the company directly or indirectly through social media; attitude including emotions and feelings both explicit and implicit; firmographic elements like functional area, type or level of employment, and industry; and psychographic elements like personality, lifestyle, values, and interests. If the ripple reduction module 132 detects context data in step 424, the context data may be extracted (step 428) and used during the interval as a component of complex matching. If the ripple reduction module does not detect context data in step 424, the method may move to step 432 in which one or more matching algorithms may be executed, based on the goals and statistics desired by the contact center.

In step 432, one or more matching algorithms may be run to match the work item to the best available agent. Each time the algorithm runs, a check may be performed to see if the clock has decremented until the time is equal to zero (step 436). If the answer is no, the method may return to step 432 and the ripple reduction module 132 may run one or more matching algorithms again. The matching and interval check continue as a loop (step 432, step 436) until the answer is returned that the clock has decremented until the time is equal to zero. When the answer is yes that the interval has expired, the work item may be assigned to a best and/or most qualified available agent by any combination of the work assignment mechanism 116, the work assignment engine 120, and the routing engine 128, determined by the last executed match, in step 440. Once the work item has been assigned to an agent, the method ends (step 444).

Figure 5:
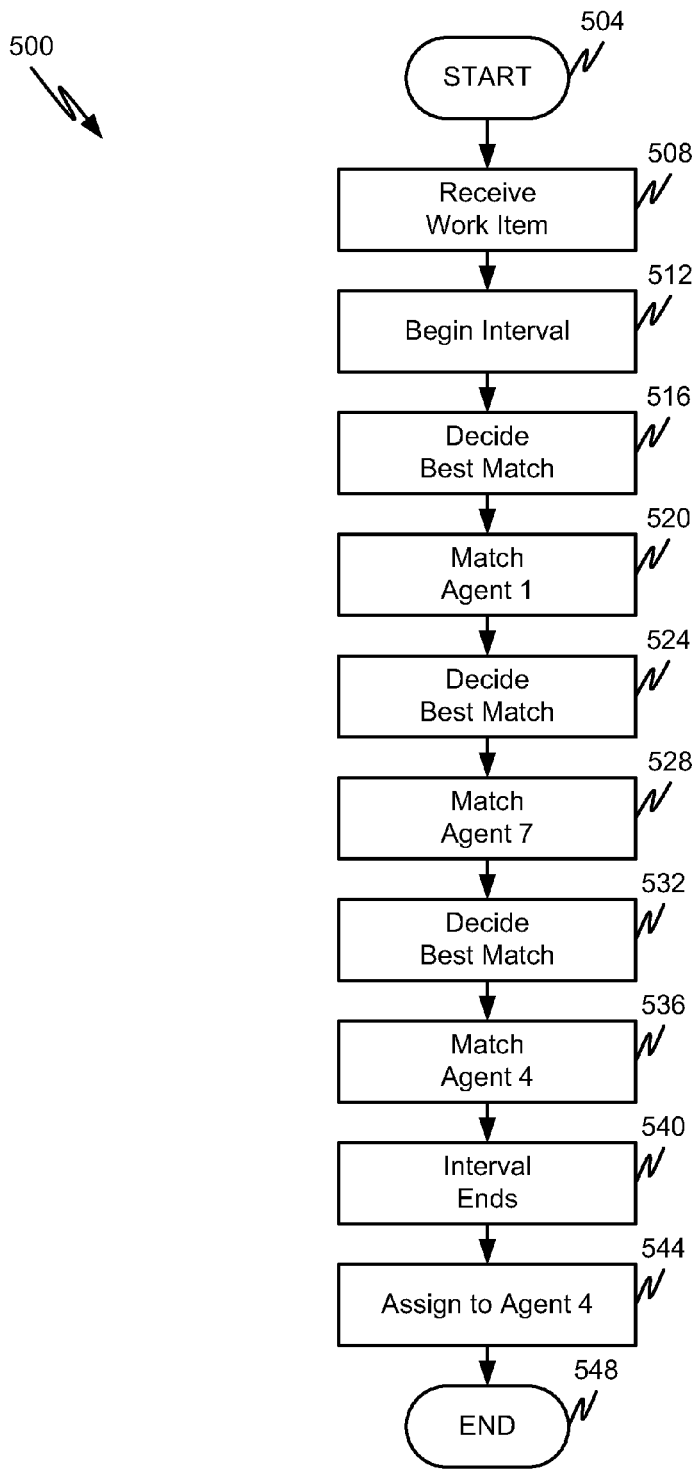
FIG. 5 is a flow diagram of a near-term simulation of optional sequences in accordance with an embodiment of the present disclosure.

FIG. 5 is a flow diagram depicting a method for near term simulation of optional sequences in accordance with an embodiment of the present disclosure. Generally, the method 500 begins with a start operation 504 and terminates with an end operation 548. While a general order for the steps of the method 500 are shown in FIG. 5, the method 500 can include more or fewer steps or the order of the steps can be arranged differently than those shown in FIG. 5. The method 500 can be executed as a set of computer-executable instructions executed by a computer system and encoded or stored on a non-transitory computer readable medium.

Typically, the method begins when a work item directed to the work assignment engine 120 within the work assignment mechanism 116 is received, in step 508. The processing of the work item may begin, in step 512, starting the interval described in FIG. 3 and FIG. 4 for a predetermined amount of time. In step 516, the matching algorithms may execute.

In a non-limiting example, the matching algorithms may determine that Agent 1 is the current best available match (step 520). The work item may not be assigned to Agent 1 since the interval has not yet expired. In step 524, the matching algorithms may execute a second time. The matching algorithms may determine that Agent 7 is the current best available match (step 528). The work item may not be assigned to Agent 7 since the interval has not yet expired. In step 532, the matching algorithms may execute a third time. The matching algorithms may determine that Agent 4 is the current best available match (step 536). The interval may end in step 540 which stops the execution of the matching algorithms. Since the interval ended while Agent 4 was determined to be the best available match, the work item may be assigned to Agent 4 (step 544). When the assignment by any of the work assignment mechanism 116, work assignment engine 120, and the routing engine 128, of the work item is completed, the method ends (step 548).

Though highlighted in the example above that best available match can change during successive execution of the matching algorithms, the best available match may or may not change depending on which agent or agents become available during the interval.

It should be appreciated that while embodiments of the present disclosure have been described in connection with a queueless contact center architecture, embodiments of the present disclosure are not so limited. In particular, those skilled in the contact center arts will appreciate that some or all of the concepts described herein may be utilized in a queue-based contact center or any other traditional contact center architecture.

Although the present disclosure describes components and functions implemented in the aspects, embodiments, and/or configurations with configurations are not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded reference to particular standards and protocols, the aspects, embodiments, and/or by faster or more effective equivalents having essentially the same functions. Such replacement standards and protocols having the same functions are considered equivalents included in the present disclosure.

The foregoing discussion has been presented for purposes of illustration and description. The foregoing is not intended to limit the disclosure to the form or forms disclosed herein. In the foregoing Detailed Description for example, various features of the disclosure are grouped together in one or more aspects, embodiments, and/or configurations for the purpose of streamlining the disclosure. The features of the aspects, embodiments, and/or configurations of the disclosure may be combined in alternate aspects, embodiments, and/or configurations other than those discussed above. This method of disclosure is not to be interpreted as reflecting an intention that the claims require more features than are expressly recited in each claim. Rather, as the following claims reflect, inventive aspects lie in less than all features of a single foregoing disclosed aspect, embodiment, and/or configuration. Thus, the following claims are hereby incorporated into this Detailed Description, with each claim standing on its own as a separate preferred embodiment of the disclosure.

What is claimed is:

1. A method performed by a processor servicing a contact center disposed within a communication network, the contact center comprising a plurality of agents, the method comprising:

collecting at a processor executing a work assignment mechanism, the work assignment mechanism being in communication with the processor servicing the contact center, a plurality of work items in the contact center, a first work item in the plurality of work items being received at a first time, and a second work item in the plurality of work items being received at a second time, wherein the second time is later than the first time but both the first and second times are within a predetermined interval of time; and analyzing at the processor executing a work assignment engine, the work assignment engine being in communication with the processor servicing the contact center, each of the plurality of work items received during the predetermined interval of time against a plurality of agents in the contact center to determine an agent to assign to service each of the plurality of work items, wherein a first agent of the plurality of agents is not available at the first time but is available within a remainder of the predetermined interval of time, and wherein a second agent of the plurality of agents is available at the first time but is less-qualified to handle the first work item as compared to the first agent.

2. The method of claim 1, wherein a result of the analysis causes the first work item in the plurality of work items to be assigned to the first agent of the plurality of agents within the predetermined interval of time.

3. The method of claim 2, wherein the assignment of the first work item in the plurality of work items received at the first time and assigned to the first agent of the plurality of agents requires a more-qualified agent as compared to the second agent.

4. The method of claim 1, wherein the analyzing comprises analyzing attributes of each of the plurality of work items and comparing the analyzed attributes of each of the plurality of work items against skills of the plurality of agents, and wherein the analyzing comprises performing a plurality of matching simulations for the plurality of work items against the plurality of agents during the predetermined interval of time.

5. The method of claim 4, wherein the plurality of matching simulations include executing a plurality of different matching algorithms, each of which are configured to optimize a different aspect of contact center performance.

6. The method of claim 1, wherein the predetermined interval of time corresponds to an amount of time sufficient to collect over one hundred work items.

7. The method of claim 6, wherein the predetermined interval of time comprises at least one of a fixed interval, a windowed interval, and a continuous interval.

8. The method of claim 1, further comprising:
obtaining at least one of historical data related to the plurality of work items and context data related to the plurality of work items, wherein the historical data is stored in an information database; and
using the obtained at least one of historical data related to the plurality of work items and context data related to the plurality of work items to assist in the analysis of each of the plurality of work items.

9. A non-transitory computer-readable medium comprising processor-executable instructions servicing a contact center disposed within a communication network, the contact center comprising a plurality of agents, the instructions comprising:
instructions that collect at a work assignment mechanism, the work assignment mechanism being in communication with a processor servicing the contact center, a plurality of work items in the contact center, a first work item in the plurality of work items being received at a first time, and a second work item in the plurality of work items being received at a second time, wherein the second time is later than the first time but both the first and second times are within a predetermined interval of time; and
instructions that analyze at a work assignment engine, the work assignment engine being in communication with the processor servicing the contact center, each of the plurality of work items received during the predetermined interval of time, against a plurality of agents in the contact center to determine an agent to assign to each of the plurality of work items, wherein a first agent of the plurality of agents is not available at the first time but is available within a remainder of the predetermined interval of time, and wherein a second agent of the plurality of agents is available at the first time but is less-qualified to handle the first work item as compared to the first agent.

10. The computer-readable medium of claim 9, wherein, as a result of the analysis, instructions to assign the first work item in the plurality of work items to the first agent of the plurality of agents within the predetermined interval of time.

11. The computer-readable medium of claim 10, wherein the instructions configured to assign the first work item in the plurality of work items received at the first time to the first agent of the plurality of agents include instructions to assign to a more-qualified agent as compared to the second agent.

12. The computer-readable medium of claim 9, wherein the instructions that analyze comprise instructions that analyze attributes of each of the plurality of work items and instructions that compare the analyzed attributes of each of the plurality of work items against skills of the plurality of agents, and wherein the instructions that analyze comprise instructions that perform a plurality of matching simulations for the plurality of work items against the plurality of agents during the predetermined interval of time.

13. The computer-readable medium of claim 12, wherein the plurality of matching simulations include instructions that execute a plurality of different matching algorithms, each of which optimize a different aspect of contact center performance, and wherein the predetermined interval of time corresponds to an amount of time sufficient to collect over one hundred work items.

14. The computer-readable medium of claim 9, wherein the predetermined interval of time comprises at least one of a fixed interval, a windowed interval, and a continuous interval.

15. The computer-readable medium of claim 9, wherein the instructions that analyze further comprise instructions that consider effects on the contact center beyond the predetermined interval of time.

16. The computer-readable medium of claim 9, further comprising:
instructions that obtain at least one of historical data related to the plurality of work items and context data related to the plurality of work items; and
instructions that use the obtained at least one of historical data related to the plurality of work items and context data related to the plurality of work items to assist in the analysis of each of the plurality of work items.

17. A communication system, comprising:
a contact center comprising a plurality of agents and a processor; and
a work assignment mechanism including:
a ripple reduction module that causes the processor to collect a plurality of work items in the contact center, a first work item in the plurality of work items being received at a first time, and a second work item in the plurality of work items being received at a second time, wherein the second time is later than the first time but both the first and second times are within a predetermined interval of time; and
the ripple reduction module that further causes the processor to analyze each of the plurality of work items received during the predetermined interval of time against a plurality of agents in the contact center to determine an agent to assign to each of the plurality of work items, wherein a first agent of the plurality of agents is not available at the first time but is available within a remainder of the predetermined interval of time, and wherein a second agent of the plurality of agents is available at the first time but is less-qualified to handle the first work item as compared to the first agent.

18. The system of claim 17, wherein the analysis comprises the processor analyzing attributes of each of the plurality of work items and comparing the analyzed attributes of each of the plurality of work items against skills of the plurality of agents, wherein the analysis comprises the processor performing a plurality of matching simulations for the plurality of work items against the plurality of agents during the predetermined interval of time, and wherein the plurality of matching simulations include the processor executing a plurality of different matching algorithms, each of which are configured to optimize a different aspect of contact center performance.

19. The system of claim 17, wherein the predetermined interval of time corresponds to an amount of time sufficient to collect over one hundred work items, wherein effects on the contact center beyond the predetermined interval of time are considered during the analysis, wherein the first work item comprises attributes making the first work item more difficult to handle than the second work item, and wherein the predetermined interval of time comprises at least one of a fixed interval, a windowed interval, and a continuous interval.

20. The system of claim 17, wherein:
the ripple reduction module performs the following operations:

obtains at least one of historical data related to the plurality of work items and context data related to the plurality of work items; and uses the obtained at least one of historical data related to the plurality of work items and context data related to the plurality of work items to assist in the analysis of each of the plurality of work items.

\* \* \* \* \*